United States Patent
Hsieh et al.

(10) Patent No.: US 8,693,192 B2
(45) Date of Patent: Apr. 8, 2014

(54) PORTABLE ELECTRONIC DEVICE

(75) Inventors: Ting-Fang Hsieh, Taipei (TW); Chen-Yang Wu, Taipei (TW); Yuan Yu, Taipei (TW); Min-Che Kao, Taipei (TW); Chun-Wen Chen, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 184 days.

(21) Appl. No.: 13/352,092

(22) Filed: Jan. 17, 2012

(65) Prior Publication Data

US 2012/0194979 A1 Aug. 2, 2012

Related U.S. Application Data

(60) Provisional application No. 61/436,855, filed on Jan. 27, 2011.

(51) Int. Cl.
*G06F 1/16* (2006.01)

(52) U.S. Cl.
USPC ...................... 361/679.59; 248/460

(58) Field of Classification Search
USPC .......... 248/460; 361/679.59, 679.01
See application file for complete search history.

(56) References Cited

U.S. PATENT DOCUMENTS

| | | | | |
|---|---|---|---|---|
| 4,113,212 | A | * | 9/1978 | Coriden .................. 248/455 |
| 5,100,098 | A | * | 3/1992 | Hawkins ................ 248/291.1 |
| 6,971,622 | B2 | * | 12/2005 | Ziegler et al. ........... 248/454 |
| 7,042,713 | B2 | * | 5/2006 | Nicolosi ............... 361/679.44 |
| 8,030,892 | B2 | * | 10/2011 | Fang et al. ................. 320/115 |
| 8,248,791 | B2 | * | 8/2012 | Wang et al. ........... 361/679.59 |
| 8,382,059 | B2 | * | 2/2013 | Le Gette et al. .......... 248/460 |
| 2008/0006745 | A1 | * | 1/2008 | Chong et al. ............. 248/166 |
| 2009/0051319 | A1 | * | 2/2009 | Fang et al. ................. 320/115 |
| 2010/0008039 | A1 | * | 1/2010 | Shen et al. ............ 361/679.55 |
| 2010/0072334 | A1 | * | 3/2010 | Le Gette et al. ........ 248/176.3 |
| 2012/0199501 | A1 | * | 8/2012 | Le Gette et al. ........ 206/45.24 |

FOREIGN PATENT DOCUMENTS

| CN | 101754609 A | 6/2010 |
|---|---|---|
| JP | 2005204005 A | 7/2005 |

* cited by examiner

*Primary Examiner* — Lisa Lea Edmonds
(74) *Attorney, Agent, or Firm* — Muncy, Geissler, Olds & Lowe, P.C.

(57) ABSTRACT

A portable electronic device includes a main body, a casing and a supporting unit. The casing is detachably connected to the main body. The supporting unit is connected to the casing and is rotatable relative to the casing. When the supporting unit rotates to a first position, the supporting unit supports the main body. When the supporting unit rotates to a second position, the casing and the main body are separated.

4 Claims, 6 Drawing Sheets

PORTABLE ELECTRONIC DEVICE

CROSS REFERENCE TO RELATED APPLICATIONS

The non-provisional patent application claims priority to U.S. provisional patent application with Ser. No. 61/436,855 filed on Jan. 27, 2011. This and all other extrinsic materials discussed herein are incorporated by reference in their entirety.

BACKGROUND OF THE INVENTION

1. Field of Invention

The invention relates to an electronic device and, more particularly, to a portable electronic device.

2. Related Art

Portable electronic devices, such as a mobile phone or a personal digital assistant (PDA), become more and more necessary in life. Since the portable electronic device may not be connected to a power source at anytime conveniently, the user may need to replace the battery periodically.

FIG. 1 is a schematic diagram showing a conventional mobile phone 1. A back cover 11 of the mobile phone 1 is fastened to a main body 12. To replace the battery, the user may use the fingertip or the nail to push a latch 111 to separate the back cover 11 from the main body 12.

However, since the size of the latch 111 is too small to be forced to, the user may get injured or damage the back cover 11 due to an inappropriate force.

SUMMARY OF THE INVENTION

A portable electronic device with a casing for easy detached is disclosed. The portable electronic device includes a main body, a casing and a supporting unit. The casing is detachably connected to the main body. The supporting unit is connected to the casing and rotatable relative to the casing. When the supporting unit rotates to a first position, the supporting unit supports the main body, and when the supporting unit rotates to a second position, the casing and the main body are separated.

These and other features, aspects and advantages of the present invention will become better understood with regard to the following description, appended claims, and accompanying drawings.

DETAILED DESCRIPTION OF THE INVENTION

A portable electronic device is illustrated with relating figures.

Figure 1:
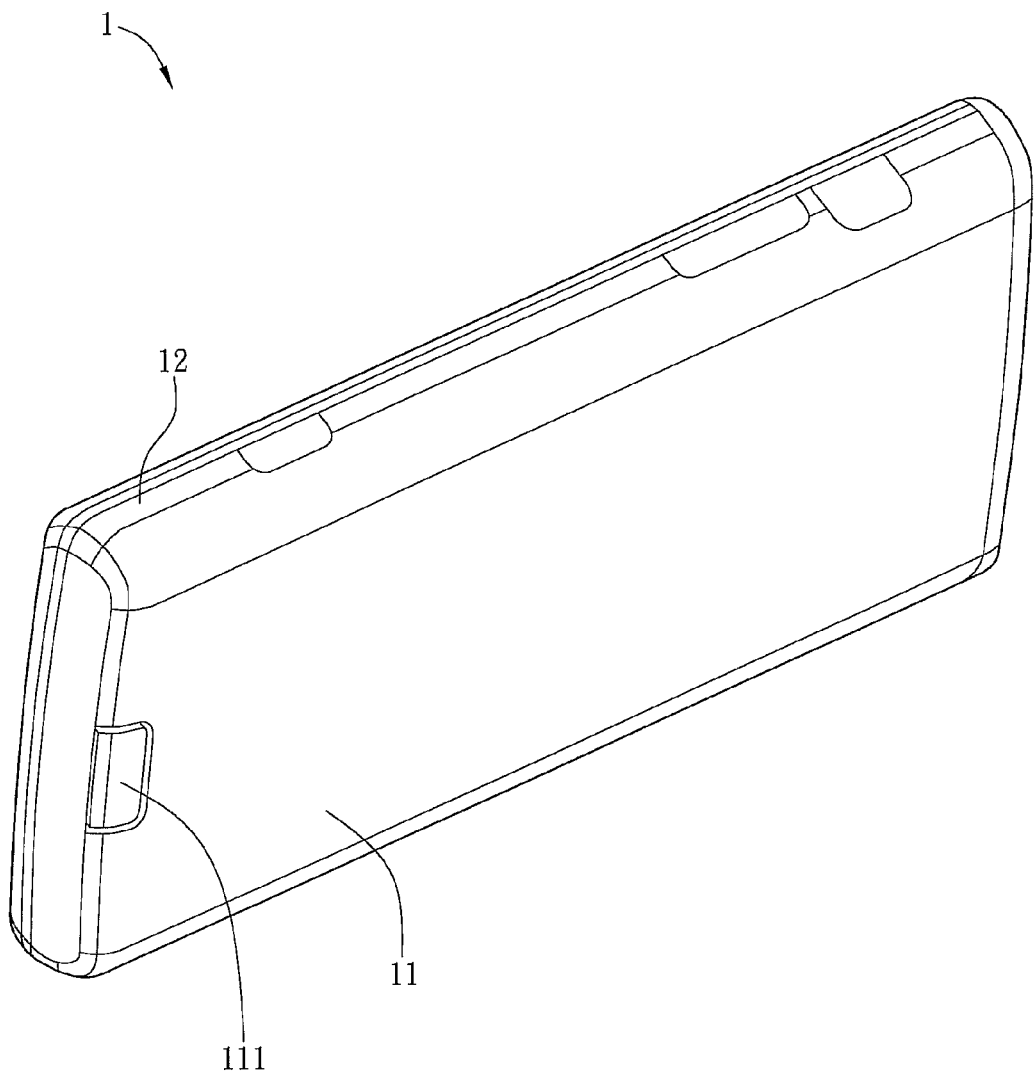
FIG. 1 is a schematic diagram showing a conventional mobile phone.
Figure 2A:
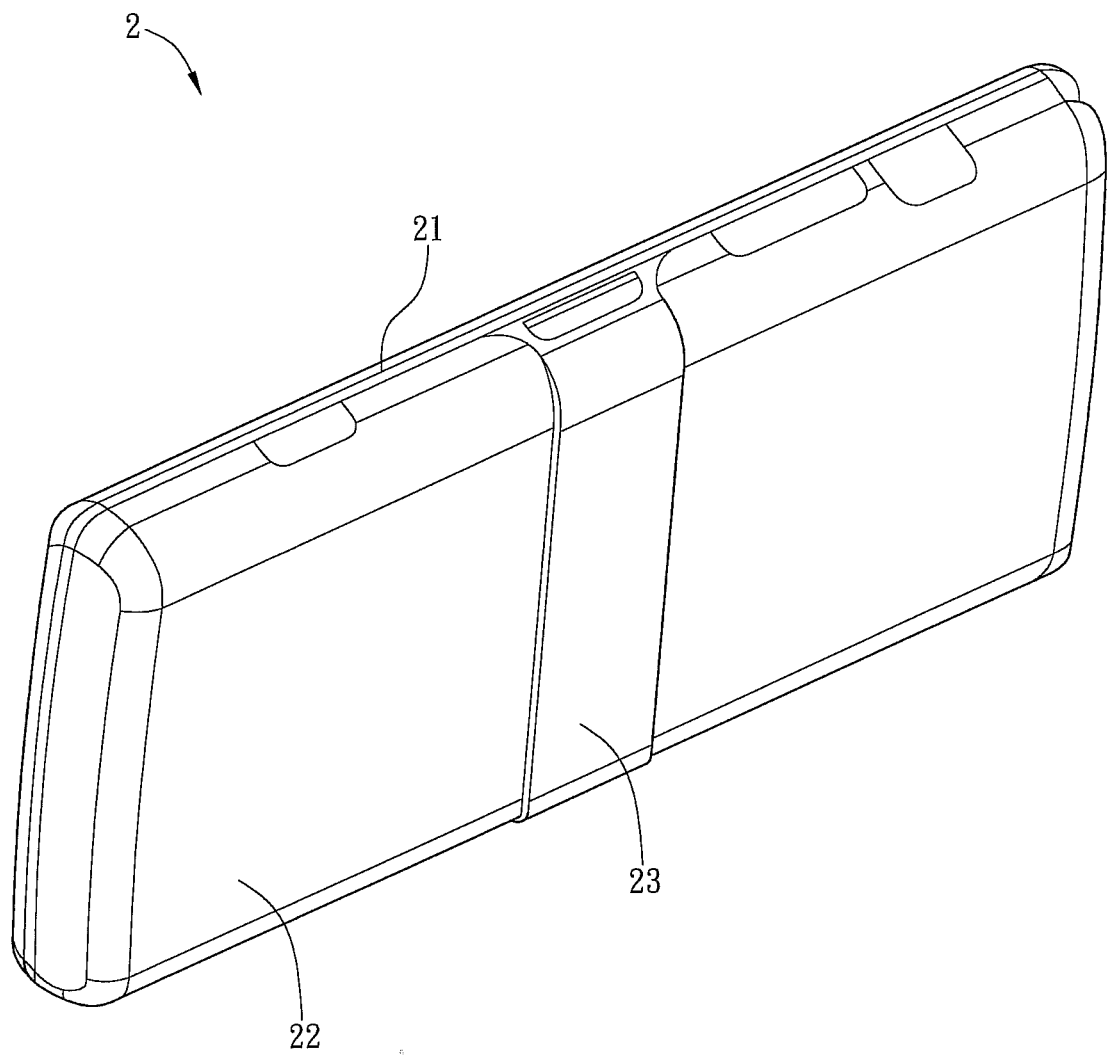
FIG. 2A is a schematic diagram showing a portable electronic device in an embodiment.
Figure 2B:
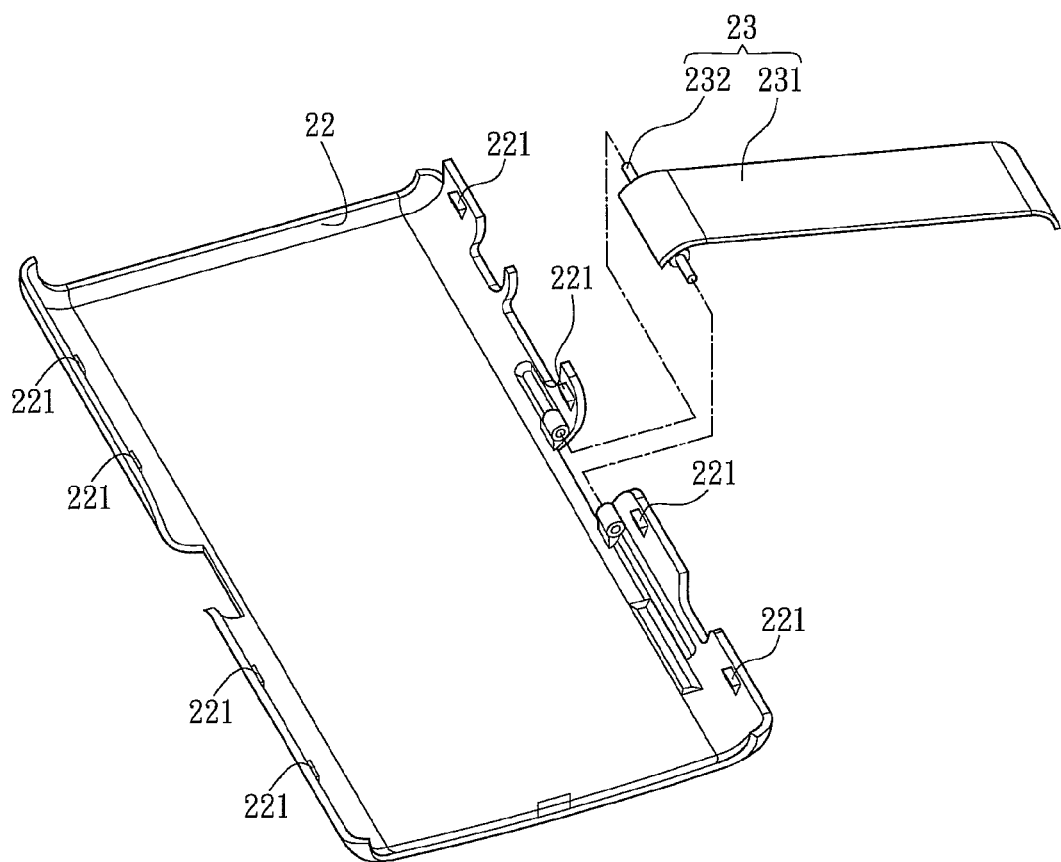
FIG. 2B is an exploded diagram showing a casing and a supporting unit in an embodiment.

FIG. 2A is a schematic diagram showing a portable electronic device 2, and FIG. 2B is an exploded diagram showing a casing 22 and a supporting unit 23.

The portable electronic device 2 may be a mobile phone, a personal digital assistant (PDA), a video player or a play station portable (PSP). The mobile phone is taken as an example herein, which is not limited. The portable electronic device 2 includes a main body 21, a casing 22 and a supporting unit 23.

The main body 21 may include a display, an input module and a power supply (not shown). The display module or the input module can be a touch control panel for example. The power supply is disposed between the main body 21 and the casing 22.

The casing 22 includes a plurality of fasteners 221, and the casing 22 is fastened to the main body 21 via the fasteners 221, which is not limited herein. The casing may also be locked or inserted to the main body according to different requirements.

The supporting unit 23 is connected to the casing 22 and rotatable relative to the casing 22. The supporting unit 23 includes a supporting element 231 and a connecting element 232. The connecting element 232 is pivotally connected to the casing 22, the supporting element 231 is connected to the connecting element 232, and the supporting element 231 and the connecting element 232 may be integratedly formed or independently formed, which is not limited herein. The supporting unit 23 may be fastened, locked, inserted or magnetically attached to the casing 22.

Figure 3:
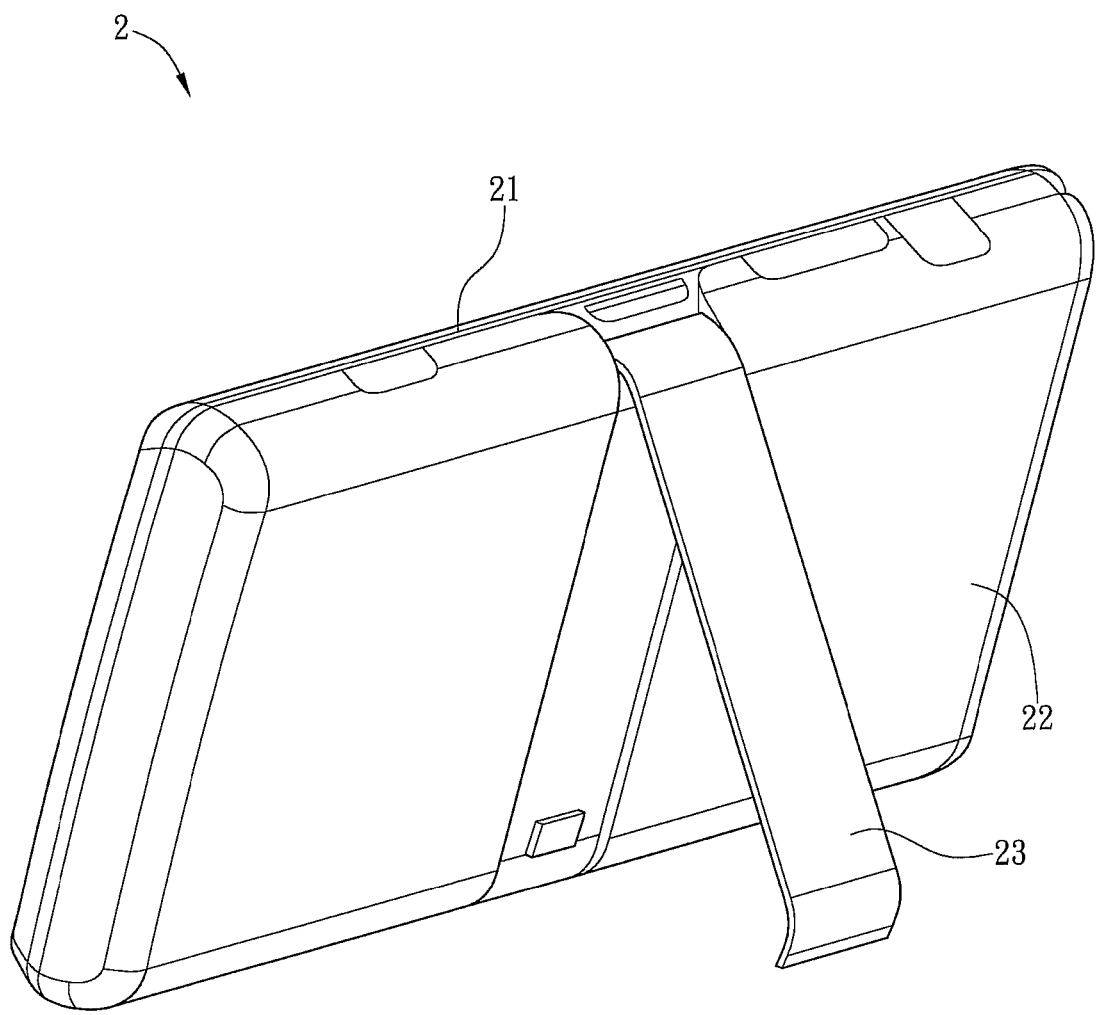
FIG. 3 is a schematic diagram showing a portable electronic device in operation.

FIG. 3 is a schematic diagram showing a portable electronic device 2 in operation. When the user rotates the supporting unit 23 outwards from the casing 22 to a first position, the supporting unit 23, as a stand, supports the main body 21 at a horizontal plane. The supporting unit 23 may be fastened to the casing 22 via a fixing structure such as a latch to fix the supporting unit 23 at the first position.

Figure 4A:
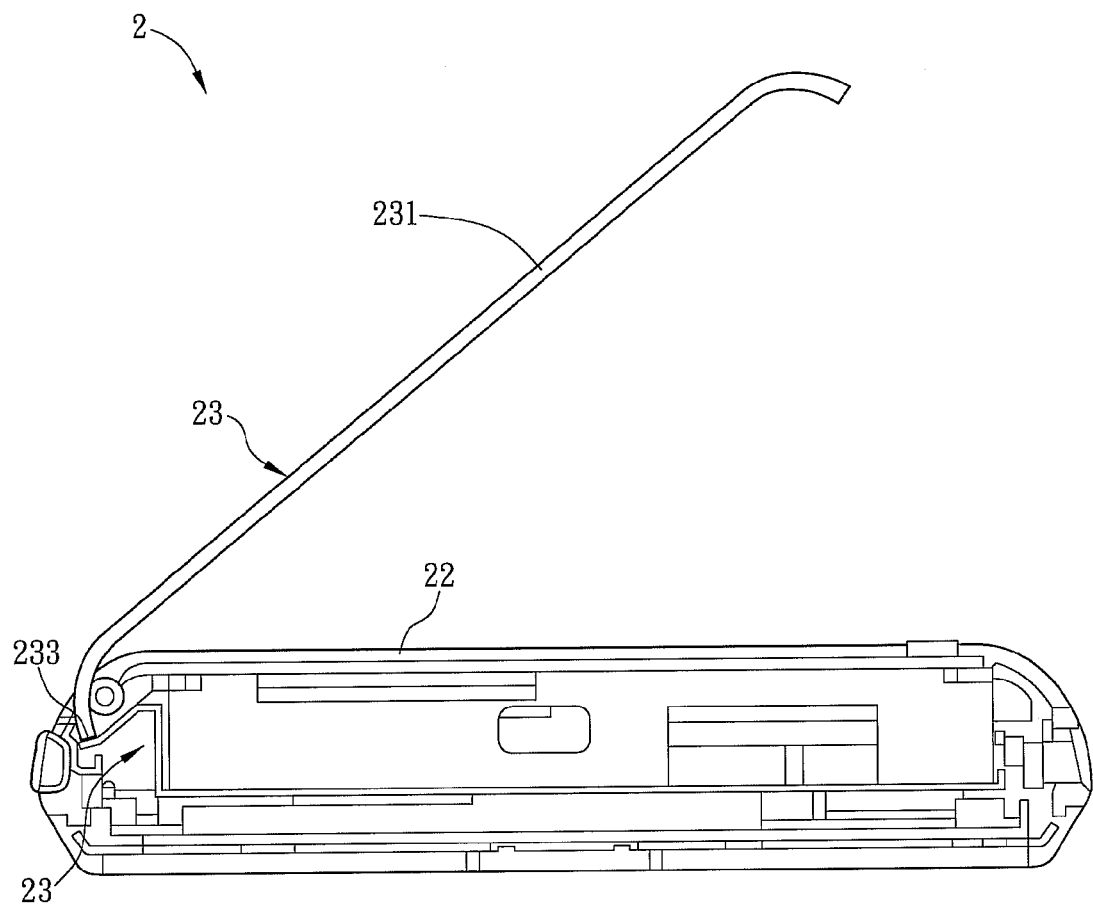
FIG. 4A is a sectional schematic diagram showing a portable electronic device in operation in an embodiment.
Figure 4B:
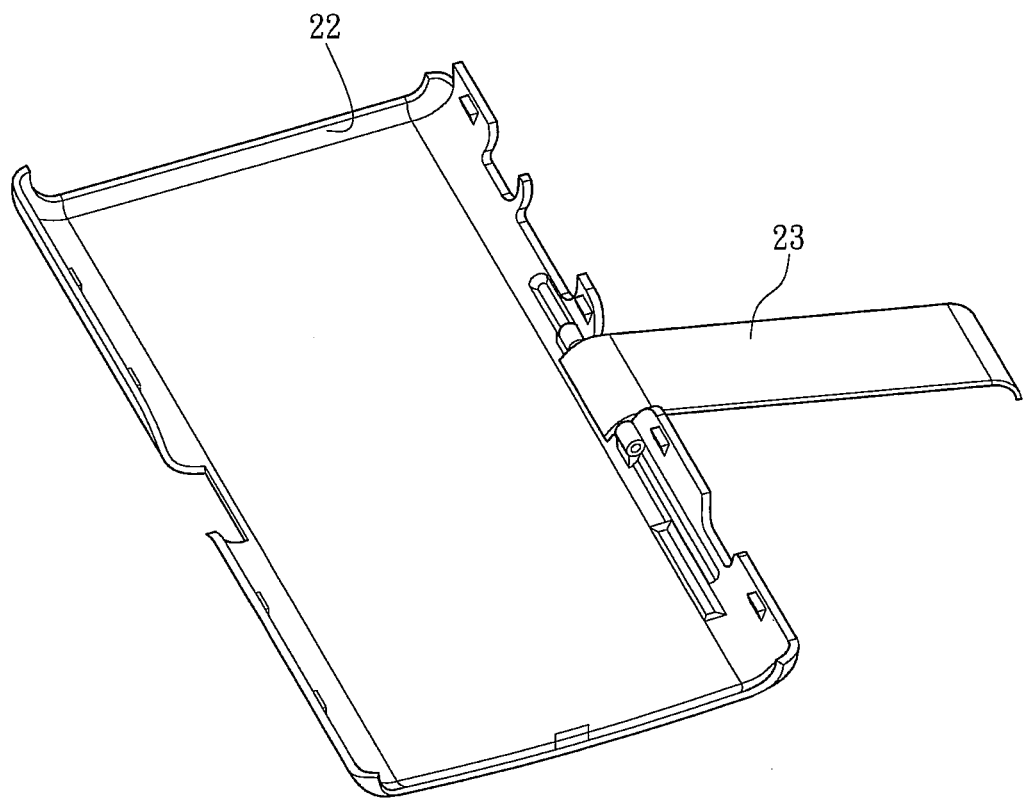
FIG. 4B is a schematic diagram showing the casing and the supporting unit separated from the main body in an embodiment.

FIG. 4A is a sectional schematic diagram showing a portable electronic device 2 in operation, and FIG. 4B is a schematic diagram showing the casing 22 and the supporting unit 23 separated from the main body. If the supporting unit 23 is at the first position and the user continues rotating the supporting unit 23 away from the casing 22, one end 233 of the supporting unit 23 abuts against the main body 21 as a supporting point, and the supporting element 231 would be regarded as an arm of force. Thus, if the user continues applying force on the supporting unit 23, the casing 22 is separated from the main body 21 under the force on the end 233 of the supporting unit 23, and the supporting unit 23 rotates to a second position (as shown in FIG. 4B).

In sum, the portable electronic device includes a supporting unit. When the supporting unit rotates to a first position, the supporting unit supports the main body. When the user continues rotating the supporting unit, since one end of the supporting unit abuts against the main body and is regarded as a supporting point, and the supporting unit is regarded as an arm of force, the user can rotate the supporting unit to a second position and separate the casing from the main body easily. Thus, the user does not need to use the fingertip or the nail to apply force, and they can detach the casing 22 easily without worrying about getting injured or damaging the casing 22.

Although the present invention has been described in considerable detail with reference to certain preferred embodiments thereof, the disclosure is not for limiting the scope. Persons having ordinary skill in the art may make various modifications and changes without departing from the scope.

Therefore, the scope of the appended claims should not be limited to the description of the preferred embodiments described above.

What is claimed is:

1. A portable electronic device, comprising:
a main body;
a casing detachably connected to the main body; and
a supporting unit including a supporting element and a connecting element, wherein the supporting element is connected to the connecting element, and the connecting element is pivotally connected to the casing, when the supporting unit rotates to a first position, the supporting element supports the main body, and when the supporting unit rotates to a second position, the casing and the main body are separated.

2. The portable electronic device according to claim 1, wherein the supporting unit is fastened, locked, inserted or magnetically attached to the casing.

3. The portable electronic device according to claim 1, wherein the casing is fastened, locked or inserted to the main body.

4. The portable electronic device according to claim 3, wherein the casing includes a plurality of fasteners, and the casing is fastened to the main body via the fasteners.

* * * * *